(12) United States Patent
Duchow (10) Patent No.: US 7,149,706 B2
(45) Date of Patent: Dec. 12, 2006

(54) SYSTEM AND METHOD FOR PROVIDING ELECTRONIC VOUCHERS

(75) Inventor: Mark Duchow, Pewaukee, WI (US)

(73) Assignee: MRD Holdings LLC, Oconomowoc, WI (US)

( * ) Notice: Subject to any disclaimer, the term of this patent is extended or adjusted under 35 U.S.C. 154(b) by 235 days.

(21) Appl. No.: 09/682,876

(22) Filed: Oct. 26, 2001

(65) Prior Publication Data

US 2002/0038237 A1    Mar. 28, 2002

Related U.S. Application Data

(63) Continuation of application No. 09/822,450, filed on Mar. 30, 2001.

(51) Int. Cl.
*G06Q 30/00* (2006.01)
*G07G 1/14* (2006.01)

(52) U.S. Cl. ............................. 705/14; 705/26; 705/27

(58) Field of Classification Search .................. 705/14
See application file for complete search history.

(56) References Cited

U.S. PATENT DOCUMENTS

| | | | | |
|---|---|---|---|---|
| 5,528,490 A | * | 6/1996 | Hill | 717/168 |
| 5,664,110 A | * | 9/1997 | Green et al. | 705/26 |
| 5,687,322 A | | 11/1997 | Deaton et al. | 395/214 |
| 5,694,551 A | * | 12/1997 | Doyle et al. | 705/26 |
| 5,710,886 A | | 1/1998 | Christensen et al. | |
| 5,710,887 A | * | 1/1998 | Chelliah et al. | 705/26 |
| 5,721,832 A | * | 2/1998 | Westrope et al. | 705/27 |
| 5,943,653 A | * | 8/1999 | Ross et al. | 705/14 |
| 5,946,665 A | * | 8/1999 | Suzuki et al. | 705/26 |
| 5,966,697 A | * | 10/1999 | Fergerson et al. | 705/26 |
| 5,983,196 A | | 11/1999 | Wendkos | |
| 5,991,739 A | | 11/1999 | Cupps et al. | 705/26 |
| 6,035,280 A | | 3/2000 | Christensen | |
| 6,039,244 A | | 3/2000 | Finsterwald | |

(Continued)

FOREIGN PATENT DOCUMENTS

WO    WO 99/52055    * 10/1999

(Continued)

OTHER PUBLICATIONS

McDowell, Kimberly, "CTS Enters $3.9 Billion Mobile Commerce Market with Neumobility, A Location Based Services Division", Business Wire, Jan. 4, 2001, 2 pp.*

(Continued)

*Primary Examiner*—Yehdega Retta
(74) *Attorney, Agent, or Firm*—Quarles & Brady LLP (57) ABSTRACT

The system and method provide access to a structured computer program through a website by a buyer via the Internet. The structured computer program displays a list of producers from a producer database to the buyer, receives a selected producer from the buyer, and stores the selected producer in memory. It displays a list of products from a product database, based on the selected producer, to the buyer, receives a selected product from the buyer, and stores the selected product in memory. It requests information from the buyer such as the buyer's zip code and email address, receives the zip code and email address from the buyer, and stores the zip code and email address in memory. Based on the selected product and the zip code, it selects a reseller geographically closest to the buyer from a reseller database and based on the selected producer and product it selects a cash value discount and expiration date from a discount database. Finally, it sends an electronic voucher to the buyer via email containing the selected producer and product, the reseller, the cash value discount, and the expiration date.

18 Claims, 4 Drawing Sheets

U.S. PATENT DOCUMENTS

| | | | |
|---|---|---|---|
| 6,101,485 | A  | 8/2000 | Fortenberry et al. .......... 705/27 |
| 6,173,267 | B1 | 1/2001 | Cairns |
| 6,185,541 | B1 | 2/2001 | Scroggie et al. .............. 705/14 |
| 6,246,997 | B1 | 6/2001 | Cybul et al. .................. 705/27 |
| 6,249,772 | B1* | 6/2001 | Walker et al. ................ 705/26 |
| 6,259,405 | B1* | 7/2001 | Stewart et al. ............. 342/457 |
| 6,292,786 | B1 | 9/2001 | Deaton et al. ................ 705/14 |
| 6,326,918 | B1 | 12/2001 | Stewart |
| 6,330,543 | B1 | 12/2001 | Kepecs ......................... 705/14 |
| 6,332,127 | B1 | 12/2001 | Bandera et al. ............... 705/14 |
| 6,360,206 | B1 | 3/2002 | Yamashita ................... 705/14 |
| 6,370,513 | B1* | 4/2002 | Kolawa et al. ............... 705/10 |
| 6,370,514 | B1 | 4/2002 | Messner ....................... 705/14 |
| 6,381,584 | B1 | 4/2002 | Ogram ......................... 705/26 |
| 6,414,635 | B1 | 7/2002 | Stewart et al. |
| 6,452,498 | B1 | 9/2002 | Stewart |
| 6,697,018 | B1 | 2/2004 | Stewart |
| 6,759,960 | B1 | 7/2004 | Stewart |
| 2001/0011225 | A1* | 8/2001 | O'Connor et al. ............. 705/9 |
| 2001/0023193 | A1* | 9/2001 | Rhoads ....................... 455/566 |
| 2001/0023407 | A1 | 9/2001 | Liyanearachchi et al. ..... 705/14 |
| 2001/0037251 | A1* | 11/2001 | Nojima et al. ................ 705/26 |
| 2002/0004746 | A1 | 1/2002 | Ferber et al. ................. 705/14 |
| 2002/0010623 | A1* | 1/2002 | McCollom et al. ........... 705/14 |
| 2002/0022970 | A1* | 2/2002 | Noll et al. ..................... 705/1 |
| 2002/0065713 | A1* | 5/2002 | Awada et al. ................. 705/14 |
| 2002/0072993 | A1* | 6/2002 | Sandus et al. ................ 705/26 |

FOREIGN PATENT DOCUMENTS

WO      WO01/27838    *   4/2001

OTHER PUBLICATIONS

Webster's II New Riverside University Dictionary, Riverside Publishing Company, 1994, pp. 503.*

"What's New on the Stingray Web site?", http://web.archive.org/web/19991004053849/www.stingrayboats.com/new.html.*

"Genmar Brands Launch Worldwide Internet Boat Clearance; Cyber-Sale' Starts Aug. 10", PR Newswire. New York: Aug. 2001. p. 1; http://proquest.umi.com/pqdweb?index=0&retrievegroup=0&srchmode=5&vinst=PROD&fmt=3&startp . . . .*

Dotdeals.com: Coupons, Rebates, Sates, Freebies, Contests, & Deals for Online & Retail Shopping, Copyright 1999. http://www.dotdeals.com.

Dealitup: Where We Find You Coupon and Stuff for Cheap, Copyright 2000. http://www.dealitup.com/Bycat.cfm.

http://www.supermarkets.com/Entry.pst dated Mar. 3, 2004, Valupage "The Smart Way to Shop!", Screen 1-3.

http://www.wayport.com/ dated Aug. 1, 2004, Screens 1-5.

* cited by examiner

SYSTEM AND METHOD FOR PROVIDING ELECTRONIC VOUCHERS

CROSS REFERENCE TO RELATED APPLICATIONS

This application is a continuation of prior application Ser. No. 09/822,450, filed Mar. 30, 2001.

BACKGROUND OF INVENTION

The present invention relates to a system and a method for providing electronic vouchers via the Internet that can be used towards the purchase of products. As used herein, the terms "product" and "products" refer to goods and not services unless specified.

The Internet has become a powerful commercial resource, providing significant opportunities for the marketing, advertising, and promotion of products to a worldwide audience. On-line marketing, advertising, and promotion are increasingly important in today's competitive marketplace. However, the Internet, like any other medium, has inherent advantages and disadvantages.

Some of the disadvantages stem from using the Internet to market, advertise, and promote products that are sold through various distribution systems. For example, in a simple version of a product distribution system there is a producer. As used herein, a producer is an entity that is identified as the source of a good and/or service. The producer may be the manufacturer of a good, it may employ a contract manufacturer to actually make its goods, or it can be the provider of a service. The producer has a distribution system which includes numerous resellers who sell the product of the producer. Finally there are buyers who purchase the product of the producer from the resellers. In actuality, product distribution systems may be much more complex than that described above having many levels of resellers and buyers within the system. However, the disadvantages inherent in using the Internet for the marketing, advertising, and promotion of products of a producer are inherent no matter the level of complexity of the distribution system.

One disadvantage is that many, if not most, websites devoted to marketing, advertising, and promoting products that are sold through a distribution system are informational in nature, and fail to provide specific incentives to encourage prospective buyers to make a purchase decision. To encourage such purchases, the buyer must be motivated to purchase the products. For example, providing buyers with favorable prices for the producer's products is typically a prime motivator in stimulating a purchase, whereas providing the buyer with the retail or "Suggested-List" price for a product is not typically a strong purchase motivator. However, in many if not most situations, a producer marketing, advertising, or promoting products that are sold through resellers over the Internet cannot promote a price other than a "Suggested-List" price. If they were to promote a specific price, producers could undermine independent pricing strategies created by their resellers or affect their own pricing structure.

A further disadvantage is encountered when the distribution system of the producer assigns geographic areas ("territories") to each reseller. In these types of systems, each reseller is given primary responsibility for the market within their territory and typically spends much time and money advertising, marketing, and promoting the producer's product with their assigned territory. In this type of distribution system, in addition to not being able to promote a selling price over the Internet as stated above, a producer cannot typically provide any type of global discount or incentive voucher to buyers without some type of restriction as to where the buyer can redeem the voucher. If a producers were to provide global vouchers to buyers, the buyer could take the voucher and redeem it at a reseller that is in a territory outside of where the buyer is located. If this is done, it is possible that the producer can be seen as providing incentives to buyers that are injuring the reseller that is losing the sales. Doing this would allow resellers to free ride on the time and money expended by other resellers to market, advertise, and promote the products within their own territory, thereby penalizing some resellers by having them expend the money and not make the sale within their territory and may cause problems within the producers distribution system. For example, a producer may provide buyers with vouchers that are redeemable for a cash discount of the sale price of a product without any restriction as to where the voucher can be redeemed. The buyers in Illinois that receive these vouchers decide to go to the reseller in Wisconsin rather than the reseller in Illinois to redeem the vouchers because the reseller in Wisconsin has a lower sale price than the reseller in Illinois. However, since the cost of doing business for the reseller in Illinois is more expensive than that of the reseller in Wisconsin, the reseller in Illinois cannot sell the product for as low a price as the reseller in Wisconsin without losing money on each sale. Therefore, although the reseller in Illinois has spent time and money developing the Illinois market, buyers are going to Wisconsin to redeem the vouchers. In this case, the Illinois reseller may see the producer as undermining its efforts to sell products in Illinois and decide that it no longer wants to sell producers products thereby leaving the producers with no distribution in Illinois.

The net result is that producers that sell products within distribution systems are currently constrained from effectively marketing, advertising, and promoting products over the Internet using the most effective buying incentive at their disposal: a specific monetary incentive for the products they sell.

SUMMARY OF THE INVENTION

The current invention avoids problems inherent in currently available systems and methods for using the Internet for the marketing, advertising, and promotion of products sold through resellers within distribution systems.

It provides an electronic voucher that contains a specific incentive, such as a discount on the purchase price, cash back, free accessories, free upgrades, etc., rather than providing a specific price, thereby allowing each reseller to set its own price, not undermining the producers pricing structure, and still providing a powerful incentive to buyers to purchase the products. For example, if the incentive is a discount on the purchase price, the buyer must contact or visit a specific reseller to receive that reseller's selling price and then apply the specific discount on the electronic voucher to that reseller's selling price, an approach that is both desirable and preferable.

The electronic voucher also directs the buyer to a specific reseller for redemption of the incentive rather than allowing a buyer to go to any reseller for redemption. This permits price competition between resellers since each reseller can still charge whatever price they wish for the product, eliminates the possibility of resellers attempting to sell the products, using the incentive, to buyers that are located outside of their assigned territories, and allows producers to channel buyers to the location appropriate for the purchase to occur based on their particular distribution structure.

It provides an incentive specific to individual products, allowing both producers and resellers to strictly control which products will be given an incentive. This is highly beneficial in terms of inventory management and profit margin control.

Finally, it provides the voucher containing the incentive to the buyer through electronic means, confirming the benefit that will be received if the buyer visits the reseller in the appropriate geographic or product area. The discount also often has a specific expiration date, forcing the prospective buyer to make a prompt decision. The combination of a specific incentive with and expiration date is a highly effective method to create urgency from the buyer's standpoint.

In one embodiment of the system of the current invention, the system comprises a means for running a structured computer program through a website by a buyer via a network. It has a means for the structured computer program to access a product database, display a list of products from the product database to the buyer, and received a product selection from the buyer. It has a means for the structured computer program to display a buyer information entry screen to the buyer and receive buyer information from the buyer. It has a memory means for storing the product selection and the buyer information from the buyer. It has a means for the structured computer program to access a reseller database and select a reseller based on the product selection and the buyer information and to access a discount database and select a discount based on the product selection. Finally, it has a means for the structured computer program to communicate the reseller and discount to the buyer.

In one embodiment of the method of the current invention, utilizing the above system, the method comprises the steps of providing access to a structured computer program through a website to a buyer via a network. Once the buyer has run the structured computer program, a plurality of products from a product database are displayed to the buyer, a product selection is received from the buyer, and the product selection is stored in memory. Once the product selection has been made, a buyer information entry screen is displayed to the buyer, buyer information is received from the buyer, and the buyer information is stored in memory. A reseller is then selected from a reseller database based on the product selection and the buyer information. A discount is then selected from a discount database based on the product selection. Finally, the reseller and discount are communicated to the buyer.

In another embodiment of the method of the current invention, utilizing the above system, the method comprises the steps of accessing a structured computer program through a website via a network. Once the structured computer program is running, viewing a plurality of products through the website and making a product selection. Once the product selection has been made, viewing a buyer information entry screen through the website and entering a plurality of buyer information. Once the buyer information has been entered, receiving an electronic voucher that includes a reseller that sells the product selected and a discount redeemable at the reseller on the purchase of the product.

In an alternate embodiment of the method of the current invention, the method comprises the steps of placing various advertisements for a variety of discounts on a variety of products. Being contacted by a buyer regarding the advertisements. Receiving a product selection and a plurality of information from the buyer. Based on the product selected by the buyer and the information received, selecting a reseller that sells the product and a discount available for the product. Finally, communicating the reseller and the discount back to the buyer.

DETAILED DESCRIPTION

The embodiment of the current invention shown in the attached drawings provides a system and method for providing electronic vouchers that electronically provides a buyer with a specific discount, on a specific product, for a specific time period, and is redeemable at a specific location.

Figure 1:
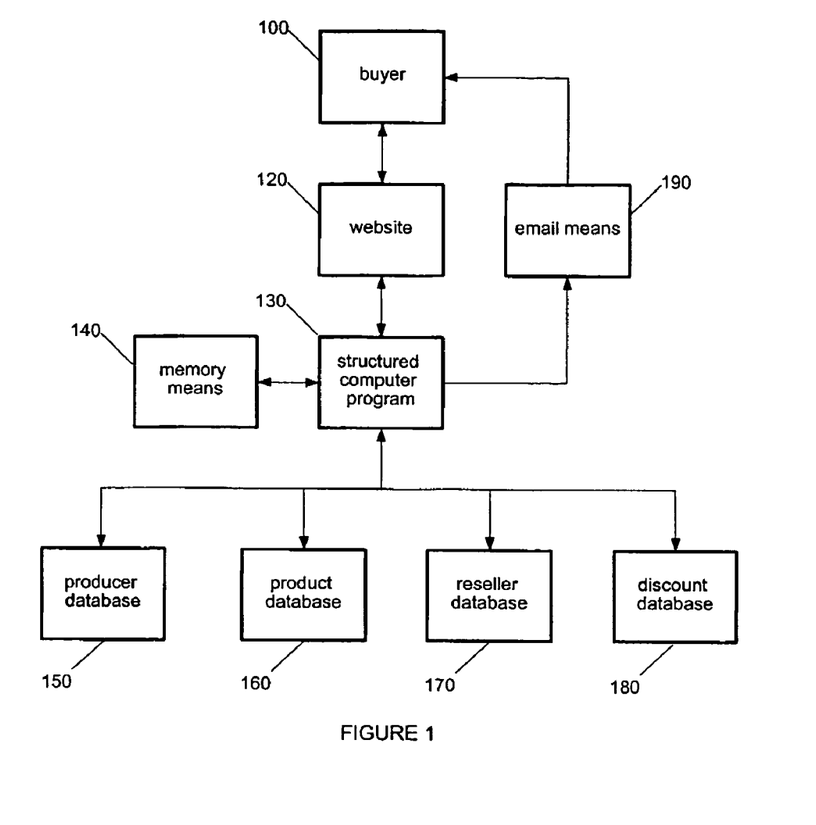
FIG. 1 sets forth a diagram of the preferred embodiment of the system for providing electronic vouchers.

Referring now to the drawings in greater detail, in FIG. 1 there is illustrated the preferred embodiment of the structure of the system for providing electronic vouchers.

In the preferred embodiment of the system of the current invention a buyer 100 accesses a website 120 through the Internet (not shown). The buyer 100 can access the website 120 using a computer, a handheld computing device or any other means that allows an individual to access a website through the Internet. In addition, the website 120 can be accessed through a local area network, a wide area network, or any other method that allows access to a website by an individual.

A structured computer program 130 is run through the website 120. The structured computer program 130 has access to a producer database 150, a product database 160, a reseller database 170, and a discount database 180. The producer database 150 provides a list of producers for which discounts are offered through the system. The product database 160 provides a list of products provided by each producer in the producer database 150. The reseller database 170 provides a list of the names and locations of the resellers that sell the product in the product database 160. The discount database 180 provides a list of the cash discounts that are available for each of the products in the product database 160 and expiration dates for each cash discount.

In alternate embodiments of the invention, the listing in the producer database 150 does not have to be actual producers but can be producers that provide in any manner any type of good and/or services. In addition, the listing in the product database 160 do not have to be physical goods but can also be services provided by the producers. Finally, the listing in the discount database 180 does not have to be cash discounts but can be any incentives that are available for each of the products in the product database.

In other alternate embodiments of the invention, there may be only one producer, one product, and/or one discount involved. In these cases, the databases can either have only the single entry for the particular producer, product, and/or discount or the respective database can be removed from the system. In addition, the discount(s) available in the discount database 180 can also be free or discounted upgrades or options, free or discounted accessories, or any incentive that would have some value to the buyer.

The structured computer program 130 also has access to a memory means 140 such as a computer hard drive or RAM where the structured computer program 130 can store information received, such as producer and product selections made by the buyer 100 and information entered by the buyer 100.

Finally, the structured computer program 130 has access to an email means 190 with which it can communicate information to the buyer 100. In alternate embodiments of the invention, the email means 190 can be any means that allows the structured computer program 130 to communicate information to the buyer 100.

Figure 2:
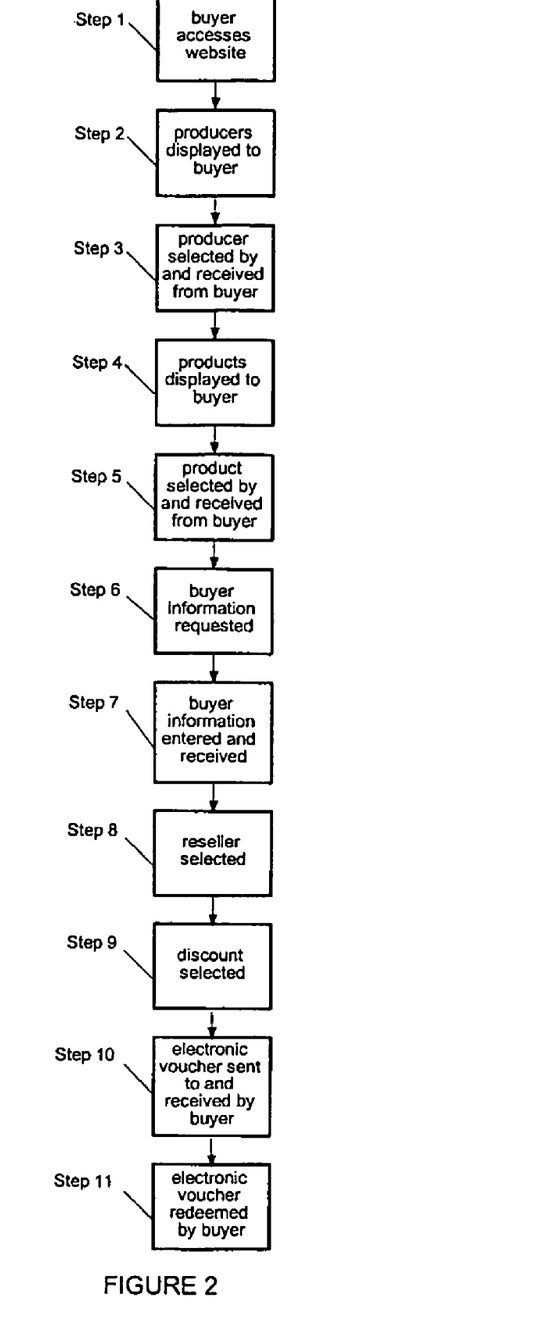
FIG. 2 sets forth a logic flow diagram of the preferred embodiment of the method for providing electronic vouchers.

In FIG. 2 there is illustrated the preferred embodiment of the method for providing electronic vouchers using the system described above.

Step 1. Buyer Accesses Website.

A buyer 100 accesses a website 120 via the Internet and runs a structured computer program 130. The buyer 100 could access the website 120 using a computer, a hand held computing device or any other device that allows an individual to access a website through a network. In addition, the website 120 can be accessed via a local area network, a wide area network, or any other method that allows access to a website by an individual.

Step 2. Producers Displayed.

The structured computer program 130 displays a list of producers from a producer database 150 to the buyer 100 through the website 120. The producer database 150 contains a list of all of the manufactures for which discounts are offered through the system. In alternate embodiments of the invention, the listing in the producer database 150 does not have to be actual producers but can be producers that provide in any manners any type of good and/or services. In another alternate embodiment of the invention, if there is only a single producer Steps 2 and 3 can be skipped. In this instance, only a list of products from the single producer would be displayed as in Step 4.

Step 3. Producer Received.

The buyer 100 selects, from the list of producers displayed the producer the buyer 100 is interested in. The structured computer program 130 then receives the selected producer from the buyer 100 and stores the selected producer in memory 140 for later access.

Step 4. Products Displayed.

The structured computer program 130 displays a list of relevant products from a product database 160 to the buyer 100 through the website 120. The product database 160 contains a list of all of the products that are provided by each of the producers in the producer database 150 that have discounts available. Based on the producer selected by the buyer 100 in Step 3, the structured computer program 130 displays a list of the products from the product database 160 that are provided by the producer selected and have discounts available. In an alternate embodiment of the invention, if a only a single product is available, the buyer could be shown a list of products that includes only one product or Steps 4 and 5 can be skipped since there would be only a single product. In this instance, the buyer information screen would be displayed as in Step 6.

Step 5. Product Received.

The buyer 100 selects from the list of products displayed the product that the buyer 100 is interested in. The structured computer program 130 then receives a selected product from the buyer 100 and stores the selected product in memory 140 for later access.

Step 6. Buyer Information Requested.

The structured computer program 130 displays a buyer information entry screen to the buyer 100 through the website 120 and requests that the buyer 100 enter the zip code where he is located and an email address. In alternate embodiments of the invention, the buyer information entry screen could request that the buyer 100 provide any information that is believed useful such as name, address, gender, occupation, etc.

Step 7. Buyer Information Received.

The buyer 100 enters a zip code and an email address, and other information that is requested, and submits this information. The structured computer program 130 then receives the zip code and email address, and other information that is requested, from the buyer 100 and stores the information in memory 140 for later access.

Step 8. Reseller Selected.

Based on the product and zip code in memory 140, the structured computer program 130 selects a reseller from a reseller database 170. The reseller database 170 contains a list of the names and locations of all of the resellers that sell the products in the product database 160. The structured computer program 130 selects the reseller that sells the product in memory 140 selected by the buyer 100 and that has the territory that includes, or is located closest to, the buyer 100 based on the zip code in memory 140 entered by the buyer.

Step 9. Discount Selected.

Based on the producer and product in memory 140, the structured computer program 130 selects a cash discount and an expiration date from a discount database 180. The discount database 180 provides a list of the cash discounts that are available for each of the products in the product database 160 and expiration dates for each discount. In alternate embodiments of the invention, the listing in the discount database 180 does not have to be cash discounts but can be any incentives that are available for each of the products in the product database such as free or discounted upgrades or options, free or discounted accessories, or any discount that would have some value to the buyer.

Step 10. Electronic Voucher Sent to Buyer.

The structured computer program 130 sends an electronic voucher to the buyer 100 at the email address in memory 140 via an email means 190. The electronic voucher contains the producer and product selected, the cash discount, the expiration date of the cash discount, and the name and location of the reseller or resellers where the electronic voucher can be redeemed. In an alternate embodiment of the invention, the structured computer program 130 can display the electronic voucher containing the producer and product selected, the cash discount, the expiration date of the cash discount, and the name and location of the reseller or resellers where the electronic voucher can be redeemed to the buyer 100 through the website 120 or by any other means of communicating this information to the buyer 100.

Step 11. Electronic Voucher Redeemed.

The buyer 100 prints the electronic voucher received from the structured computer program 130 and brings the printed electronic voucher to the reseller listed on the printed electronic voucher for redemption. The printed electronic voucher can only be redeemed at the reseller listed, for the product listed, and prior to the expiration date listed.

Figure 3:
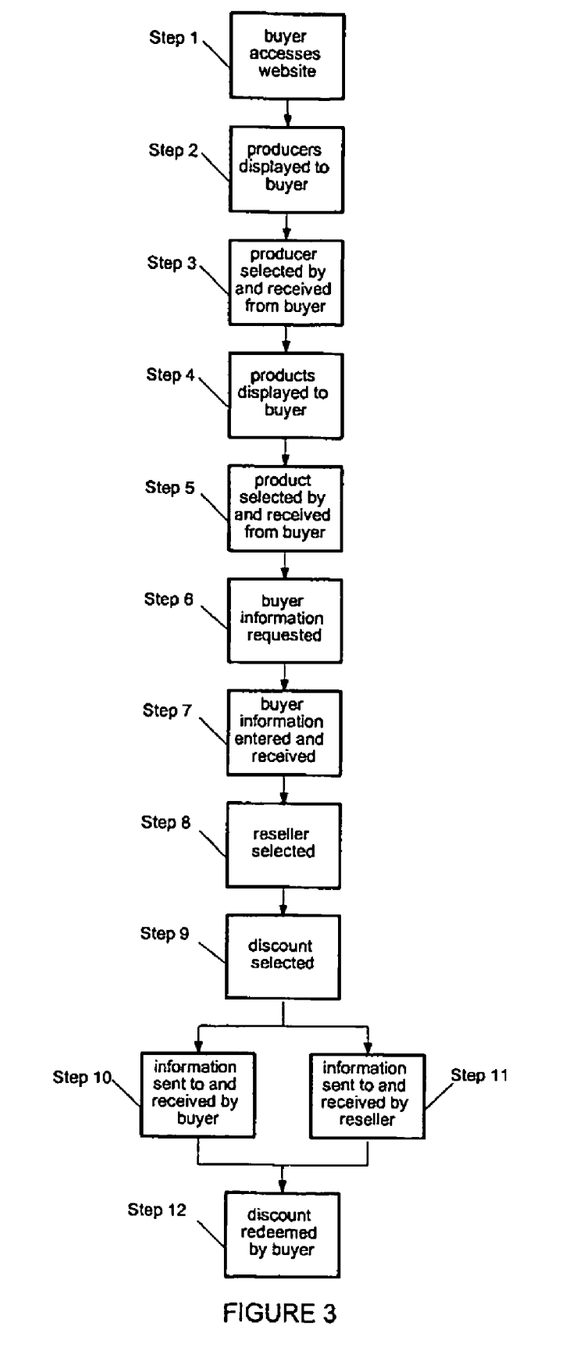
FIG. 3 sets forth a logic flow diagram of an alternate embodiment of the method for providing electronic vouchers.

In FIG. 3 there is illustrated an alternate embodiment of the method for providing electronic vouchers. In this alternate embodiment, the reseller, the producer and product selected, the cash discount, and the expiration date are communicated to the buyer, and the producer and product selected, the cash discount, the expiration date, and the buyer information are communicated to the reseller. Therefore, the buyer only has to show up at the reseller to redeem the cash discount and does not have to bring a printed voucher with them.

Step 1. Buyer Accesses Website.

A buyer 100 accesses a website 120 via the Internet and runs a structured computer program 130. The buyer 100 could access the website 120 using a computer, a hand held computing device or any other device that allows an individual to access a website through a network. In addition, the website 120 can be accessed via a local area network, a wide area network, or any other method that allows individual to connect with a website.

Step 2. Producers Displayed.

The structured computer program 130 displays a list of producers from a producer database 150 to the buyer 100 through the website 120. The producer database 150 contains a list of all of the manufactures for which discounts are offered through the system. In alternate embodiments of the invention, the listing in the producer database 150 does not have to be actual producers but can be producers that provide in any manner any type of good and/or services. In another alternate embodiment of the invention, if there is only a single producer Steps 2 and 3 can be skipped. In this instance, only a list of products from the single producer would be displayed as in Step 4.

Step 3. Producer Received.

The buyer 100 selects, from the list of producers displayed, the producer the buyer 100 is interested in. The structured computer program 130 then receives the selected producer from the buyer 100 and stores the selected producer in memory 140 for later access.

Step 4. Products Displayed.

The structured computer program 130 displays a list of relevant products from a product database 160 to the buyer 100 through the website 120. The product database 160 contains a list of all of the products that are provided by each of the producers in the producer database 150 that have discounts available. Based on the producer selected by the buyer 100 in Step 3, the structured computer program 130 displays a list of the products from the product database 160 that are provided by the producer selected and have discounts available. In an alternate embodiment of the invention, if a only a single product is available, the buyer could be shown a list of products that includes only one product or Steps 4 and 5 can be skipped since there would be only a single product. In this instance, the buyer information screen would be displayed as in Step 6.

Step 5. Product Received.

The buyer 100 selects from the list of products displayed the product that the buyer 100 is interested in. The structured computer program 130 then receives a selected product from the buyer 100 and stores the selected product in memory 140 for later access.

Step 6. Buyer Information Requested.

The structured computer program 130 displays a buyer information entry screen to the buyer 100 through the website 120 and requests that the buyer 100 enter the zip code where he is located, an email address, and some type of identifying information such as a name, social security number, or PIN. The buyer information entry screen could also request that the buyer 100 provide any information that is believed useful such as address, gender, occupation, etc.

Step 7. Buyer Information Received.

The buyer 100 enters a zip code, an email address, and identifying information, and other information that is requested, and submits this information. The structured computer program 130 then receives the zip code, email address, identifying information, and other information, from the buyer 100 and stores the information in memory 140 for later access.

Step 8. Reseller Selected.

Based on the model and zip code in memory 140, the structured computer program 130 selects a reseller from a reseller database 170. The reseller database 170 contains a list of the names and locations of all of the resellers that sell the products in the product database 160. The structured computer program 130 selects the reseller or resellers that sell the product selected by the buyer 100 and that are located closest to the buyer 100 based on the zip code entered by the buyer.

Step 9. Discount Selected.

Based on the producer and product in memory 140, the structured computer program 130 selects a cash discount and an expiration date from a discount database 180. The discount database 180 provides a list of the cash discounts that are available for each of the products in the product database 160 and expiration dates for each discount. In alternate embodiments of the invention, the listing in the discount database 180 does not have to be cash discounts but can be any incentives that are available for each of the products in the product database such as free or discounted upgrades or options, free or discounted accessories, or any discount that would have some value to the buyer.

Step 10. Information Sent to Buyer.

The structured computer program 130 sends the producer and product selected, the cash discount, the expiration date of the cash discount, the identifying information, and the name and location of the reseller or resellers where the electronic voucher can be redeemed to the buyer 100 at the email address in memory 140 via an email means 190. In an alternate embodiment of the invention, the structured computer program 130 can display the producer and product selected, the cash discount, the expiration date of the cash discount, the identifying information, and the name and location of the reseller or resellers where the electronic voucher can be redeemed to the buyer 100 through the website 120.

Step 11. Information Sent to Reseller.

The structured computer program 130 sends the producer and product selected, the cash discount, the expiration date of the cash discount, and the identifying information to the reseller or resellers selected. This information can be sent to the reseller or resellers by email, by fax, or by any other method that would communicate this information to the resellers quickly and accurately.

Step 12. Discount Redeemed.

The buyer 100 goes to the reseller identified in Step 10 above and provides the reseller with their identifying information. Based on this identifying information, the reseller can then find the producer and product the buyer 100 is interested in, the cash discount to be provided, and the expiration date of the discount from the information received in Step 11 above. The discount provided can only be redeemed for the producer and product listed and prior to the expiration date listed.

Figure 4:
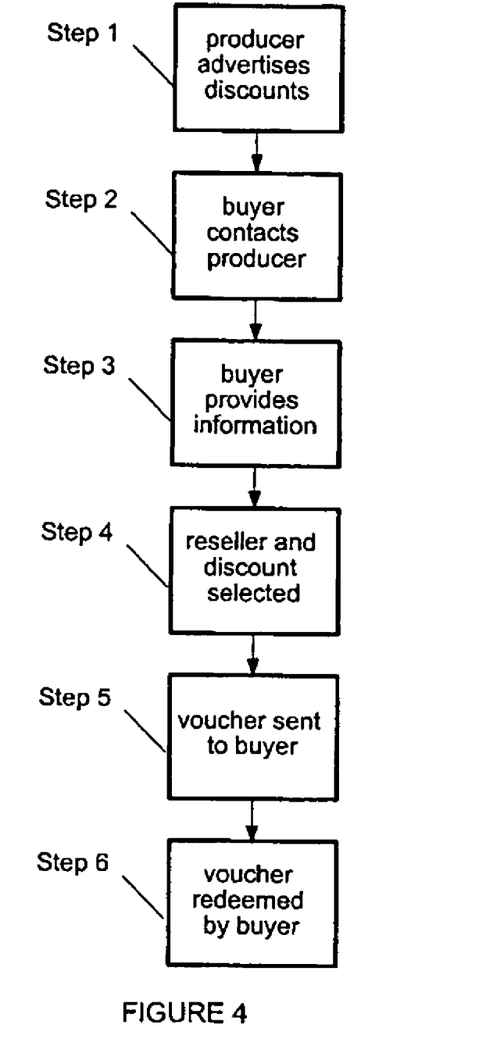
FIG. 4 sets forth a logic flow diagram of an alternate embodiment for providing vouchers.

Although the above embodiments of the method of the current invention both use a website, it is not necessary that a website be used in order to practice this invention. In FIG. 4 there is illustrated an alternate embodiment of the method of the current invention that addresses the same needs and solves the same problems but does not use a website.

Step 1. Producer Advertises Discounts.

A producer advertises the discounts that it is making available to buyers. The producer does not have to be actual manufacturer of a product but can be a producer that provides in any manner any type of good and/or services. The advertisement can be a newspaper or magazine add, a television or radio commercial, or any other method to communicate the available discounts to buyers. Preferably, this advertisement would include a list of the products for which discounts are available and information on how to contact the producer to receive the discount. Alternatively, the advertisement could also include the discounts that are available for each product, the expiration date of each offered discount, and a statement that the discounts are only available at certain sellers.

Step 2. Buyer Contacts Producer.

Based on the advertisement from Step 1 that the buyer receives from the producer, the buyer then contacts the producer through whatever means were identified in the advertisement. Preferably, the buyer would call a telephone number identified in the advertisement. Alternatively, the buyer may also be requested to return a postcard, send an email, or somehow otherwise communicate to the producer that they are interested in the discount.

Step 3. Buyer Provides Information.

When the buyer contacts the producer, the buyer provides information to the producer. This information may include, but is not limited to, the product the buyer is interested in, the buyer's address and zip code, and any other information the producer may be interested in. This information can be provided over the telephone, written on a return postcard, or included in an email as stated above.

Step 4. Reseller, Discount, and Expiration Date Selected.

Based on the product identified by the buyer and the address and/or zip code provided by the buyer, the producer selects a specific reseller, discount and expiration date. The reseller selected will be the reseller that is geographically closest to the buyer, based on the address and/or zip code provided by the buyer, that sells the product selected by the buyer. The reseller, discount, and expiration date can be obtained by the producer in a variety of ways such as through printed tables which list this information, computerized databases, or any other means which would allow the producer to keep track of the products available, the resellers that sell these products and their locations, the discounts available on each product, and the expiration dates of each discount. In the preferred embodiment of the invention, the discount provided is a cash value discount that can be used towards the purchase of the product. In alternate embodiments of the invention, the discount can be free or discounted upgrades or options, free or discounted accessories, or any discount that would have some value to the buyer.

Step 5. Voucher Sent to Buyer.

The producer sends a voucher to the buyer that contains the product selected by the buyer, the discount available on that product, the expiration date of the discount, and the reseller at which the voucher can be redeemed.

Step 6. Voucher Redeemed.

The buyer brings the voucher to the reseller listed on the voucher for redemption. The voucher can only be redeemed at the reseller listed, for the product listed, and prior to the expiration date listed.

The foregoing description of the preferred embodiments of the invention have been presented for purposes of illustration and description, and are not intended to be exhaustive or to limit the invention to the precise forms disclosed. The descriptions were selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

The invention claimed is:

1. A method of distributing a voucher to a prospective customer over the Internet which is redeemable for a producer's purchase incentive, said purchase incentive including at least one of: a purchase price discount, a free upgrade or a free accessory, on a purchase price of a manufactured product at a specific reseller; the method comprising:

providing at least one screen display to the prospective customer through the Internet to allow the prospective customer to select a producer;

receiving the selection of a producer from the prospective customer;

providing at least one screen display to the prospective customer through the Internet to allow the prospective customer to select only one product of said producer;

receiving the selection of the only one product of the one producer from the prospective customer through the Internet at the website:

after receiving the selection of only one product from said prospective customer and before displaying any amount of any purchase incentive to the prospective customer, providing a screen display to the prospective customer which requests the prospective customer to enter personal contact information and a postal address code;

receiving at the website from the prospective customer through the Internet said personal contact information and said postal address code corresponding to the selection of the only one product;

after the website receiving the selection of the only one product and the personal contact information and the postal address code from the prospective customer, the website selecting only one reseller from a plurality of available resellers based on the selection of the only one product and based on the postal address code being within, or closest to, a pre-defined marketing territory of the reseller;

the website then generating a voucher having a time limit for redemption and having a producer's purchase incentive on the purchase of the only one selected product at the only one selected reseller; and communicating the voucher for the only one selected product to at least one of the prospective customer and the selected reseller over the Internet.

2. The method of claim 1, wherein the prospective customer's control over selection of the reseller is limited to the customer entering the selection of only one product and entering the postal address code.

3. The method of claim 1, wherein the reseller is selected by the website in a sequence in which a purchase price of the product is not displayed to the prospective customer.

4. The method of claim 1, wherein the selection of the only one product, the entry of personal contact information and communication of the voucher occurs in only one access to the website.

5. The method of claim 1, wherein a voucher is communicated for only one product for each access of the website.

6. The method of claim 1, wherein the pre-defined marketing territory is an exclusive marketing territory assigned to the reseller by the producer of the selected product.

7. The method of claim 1, wherein said selection of the reseller does not use either pre-stored demographic data or direct customer selection through a screen display.

8. The method of claim 1, wherein the purchase incentive is a purchase price discount of the selected product.

9. The method of claim 1, wherein the personal contact information includes an e-mail address of the prospective customer.

10. A method of distributing a voucher to a prospective customer over the Internet which is redeemable for a producer's purchase incentive, said purchase incentive including at least one of: a purchase price discount, a free upgrade or a free accessory, on a purchase price of a manufactured product at a specific reseller; the method comprising:

providing at least one screen display to the prospective customer through the Internet to allow the prospective customer to select only one product of one producer;

receiving the selection of only one product of the one producer from the prospective customer through the Internet at the website;

after receiving the selection of only one product from said prospective customer and before displaying any amount of any purchase incentive to the prospective customer, providing a screen display to the prospective customer which requests the prospective customer to enter personal contact information and a postal address code;

receiving at the website from the prospective customer through the Internet said personal contact information and said postal address code corresponding to the selection of the only one product;

after the website receiving the selection of the only one product and the personal contact information and the postal address code from the prospective customer, after the website selecting only one reseller from a plurality of available resellers based on the selection of the only one product and based on the postal address code being within, or closest to, a pre-defined marketing territory of the reseller;

the website generating a voucher having a time limit for redemption and having a producer's purchase incentive on the purchase of the only one selected product at the selected reseller; and communicating the voucher for the only one selected product to at least one of the prospective customer and the selected reseller over the Internet as voucher data.

11. The method of claim 10, wherein the prospective customer's control over selection of the reseller is limited to the customer entering the product selection and entering the postal address code.

12. The method of claim 10, wherein the reseller is selected by the website in a sequence in which a purchase price of the product is not displayed to the prospective customer.

13. The method of claim 10, wherein the selection of the only one product, the entry of personal contact information and communication of the voucher occurs in only one access to the website.

14. The method of claim 10, wherein a voucher is communicated for only one product for each access of the website.

15. The method of claim 10, wherein the pre-defined marketing territory is an exclusive marketing territory assigned to the reseller by the producer of the selected product.

16. The method of claim 10, wherein said selection of the reseller does not utilize pre-stored demographic data or direct customer selection through a screen display.

17. The method of claim 10, wherein the purchase incentive is a purchase price discount of the selected product.

18. The method of claim 10, wherein the personal contact information includes an e-mail address of the prospective customer.

* * * * *